(12) United States Patent
Cagno et al.

(10) Patent No.: US 7,428,623 B2
(45) Date of Patent: Sep. 23, 2008

(54) APPARATUS AND METHOD TO SET SIGNAL COMPENSATION SETTINGS FOR A DATA STORAGE DEVICE

(75) Inventors: Brian J. Cagno, Tucson, AZ (US);
Robert A. Kubo, Tucson, AZ (US);
Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/145,386

(22) Filed: Jun. 3, 2005

(65) Prior Publication Data

US 2006/0277327 A1 Dec. 7, 2006

(51) Int. Cl.
*G06F 13/00* (2006.01)
*G06F 12/00* (2006.01)
(52) U.S. Cl. .................. 711/167; 711/100; 711/112; 711/154

(58) Field of Classification Search ................. 711/111, 711/112, 114, 113, 100, 154, 167; 375/232; 710/33
See application file for complete search history.

(56) References Cited

U.S. PATENT DOCUMENTS

2006/0047900 A1* 3/2006 Tanaka et al. ............... 711/113
2006/0140262 A1* 6/2006 Kuijk et al. ................. 375/232

OTHER PUBLICATIONS

Kano Technologies Corporation, "SureVAULT 800", Aug. 2003, pp. 1-9.

* cited by examiner

*Primary Examiner*—Tuan V. Thai
(74) *Attorney, Agent, or Firm*—Dale F. Regelman; Quarles & Brady LLP (57) ABSTRACT

A method is disclosed to set signal compensation settings for a data storage device comprising a first port and a second port, where that first port is interconnected to a first switch via a first communication pathway having a predetermined first length. The method determines first signal compensation settings based upon the first length.

4 Claims, 6 Drawing Sheets

APPARATUS AND METHOD TO SET SIGNAL COMPENSATION SETTINGS FOR A DATA STORAGE DEVICE

FIELD OF THE INVENTION

This invention relates to an apparatus and method to set signal compensation settings for a data storage device disposed in an information storage and retrieval system.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a read request, the system recalls information from the one or more data storage devices and moves that information to the data cache. Thus, the system is continuously moving information to and from a plurality of data storage devices, and to and from the data cache.

What is needed is an apparatus and method to enhance communication of data to and from a data storage device disposed in an information storage and retrieval system. Applicants' invention provides a method to set signal compensation settings for a data storage device.

SUMMARY OF THE INVENTION

Applicants' invention comprises a method to set signal compensation settings for a data storage device comprising a first port and a second port, where that first port is interconnected to a first switch via a first communication pathway having a predetermined first length. The method determines first signal compensation settings based upon the first length.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes a plurality of device adapters, and a data cache. The following description of Applicant's method is not meant, however, to limit Applicant's invention to data processing applications, as the invention herein can be generally applied to providing data to and from information storage devices.

Figure 1:
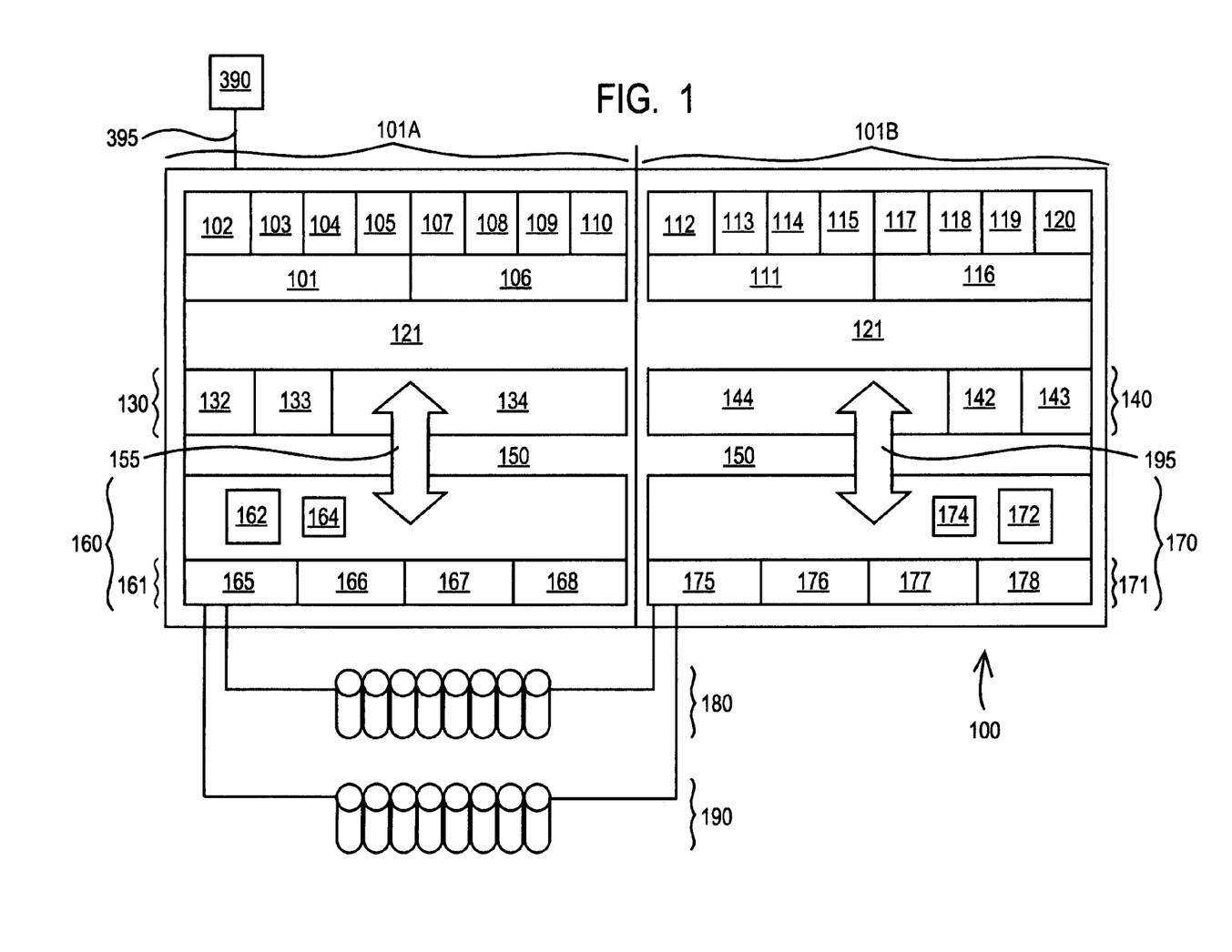
FIG. 1 is a block diagram showing a one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).) In certain embodiments, host computer 390 further includes a storage management program. The storage management program in the host computer 390 may include the functionality of storage management type programs known in the art that manage the transfer of data to and from a data storage and retrieval system, such as the IBM DFSMS implemented in the IBM MVS operating system.

In certain embodiments, Applicants' information storage and retrieval system includes a plurality of host adapters. In the illustrated embodiment of FIG. 1, system 100 comprises host adapters 102-105, 107-110, 112-115 and 117-120. In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' information storage and retrieval system. Similarly, in certain embodiments, one or more host adapters, processor portion 140, one or more device adapters are disposed on a second control card disposed in Applicants' information storage and retrieval system.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
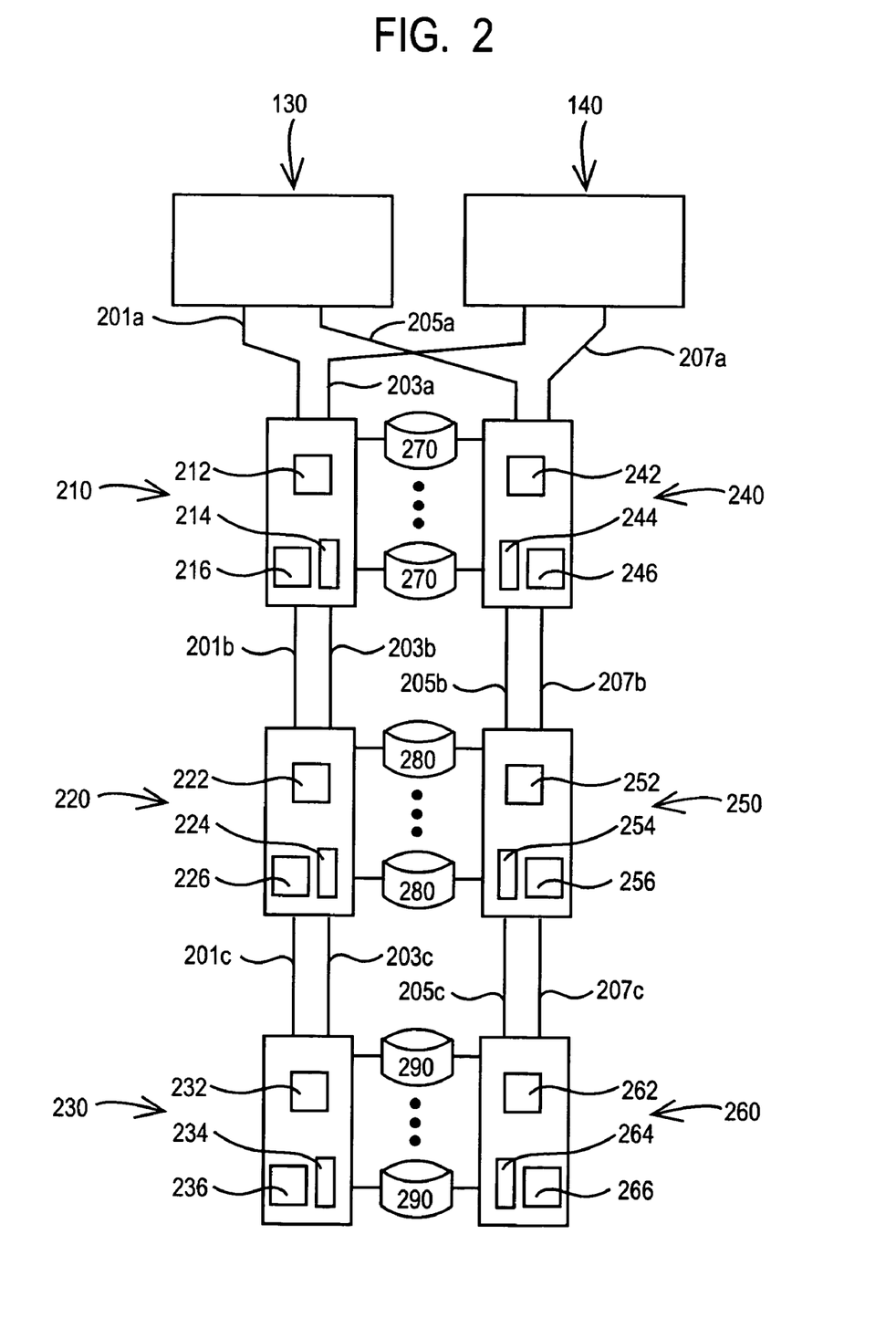
FIG. 2 is a block diagram showing the data storage and retrieval system of FIG. 1 comprising three storage arrays.

In the illustrated embodiment of FIG. 2, Applicants' information storage and retrieval system comprises dual FC-AL loops of switches where the system controllers 130 and 140 are interconnected with two FC-AL loops. Each loop contains one or more local controllers, such as local controllers 210, 220, 230, 240, 250, and 260.

Each local controller comprises a switch, a processor, and microcode. In certain embodiments, the switch comprises a Fibre Channel switch. In certain embodiments, the processor comprises a SES processor. For example, local controllers 210, 220, 230, 240, 250, and 260, include processors 212, 222, 232, 242, 252, and 262, respectively. Similarly, local controllers 210, 220, 230, 240, 250, and 260, include switches 214, 224, 234, 244, 254, and 264, respectively. In addition, local controllers 210, 220, 230, 240, 250, and 260, include microcode 216, 226, 236, 246, 256, and 266, respectively.

Figure 3:
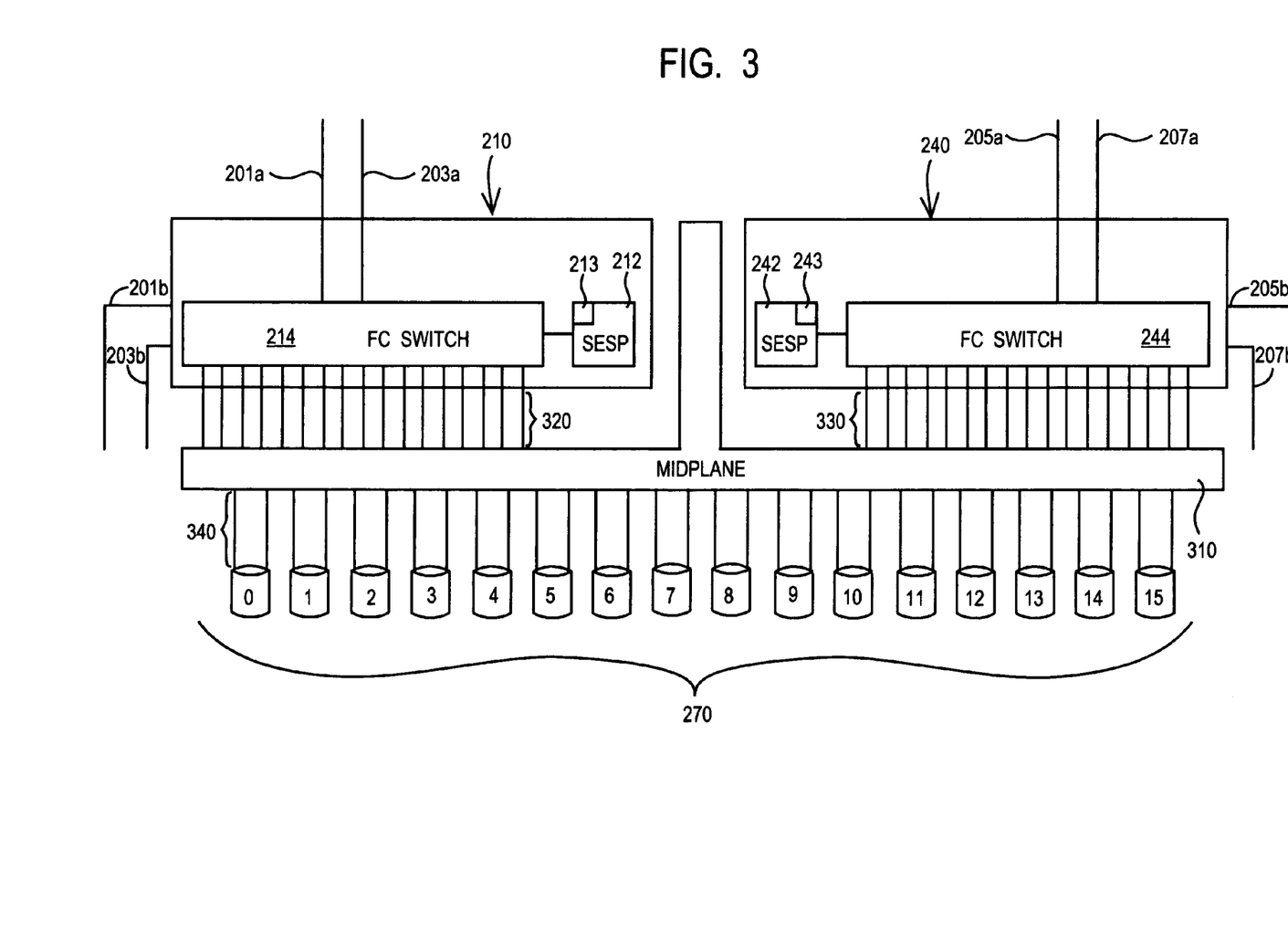
FIG. 3 is a block diagram showing one storage array interconnected to two controllers.
Figure 4:
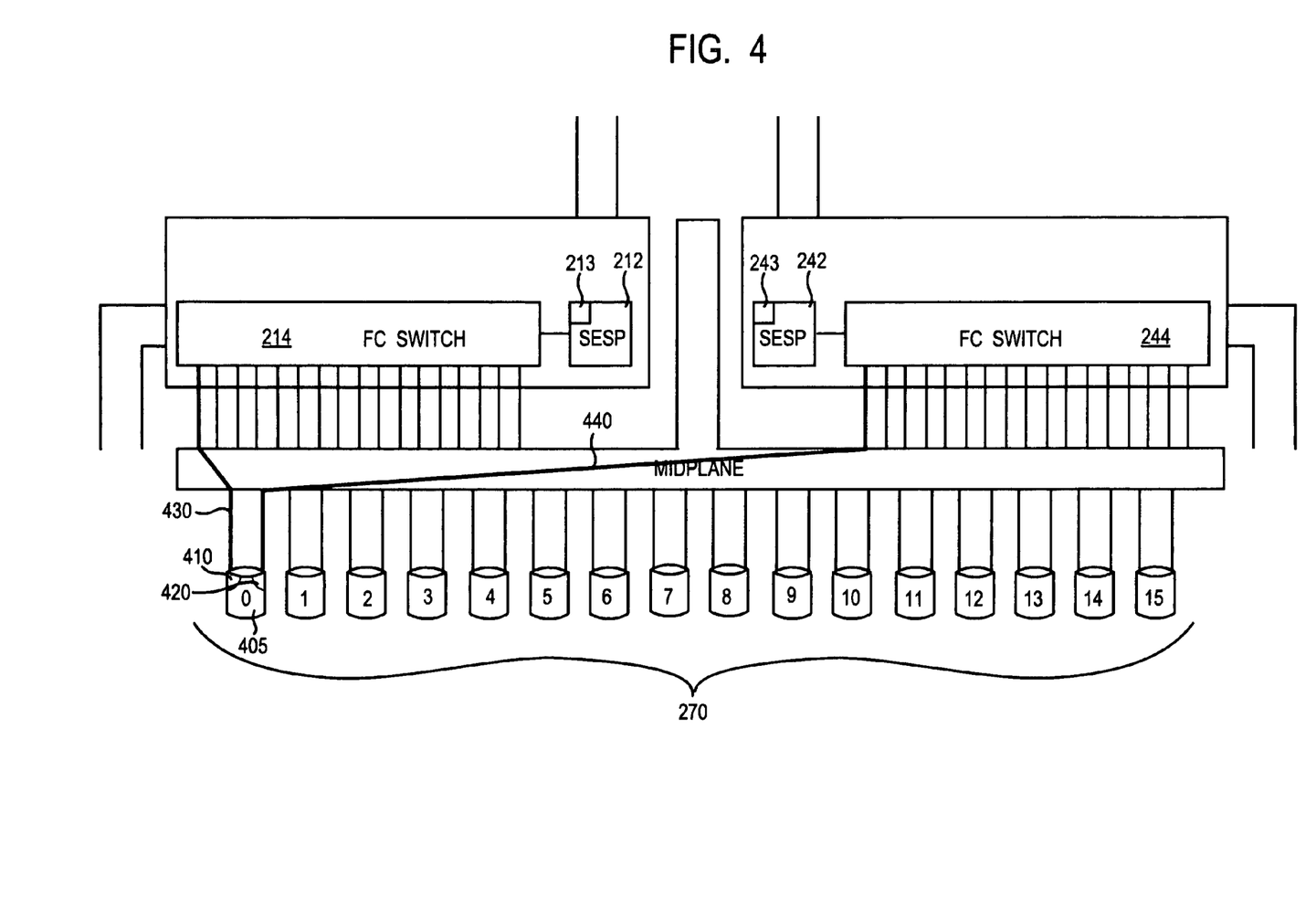
FIG. 4 is a block diagram showing a first communication pathway interconnecting a data storage device to a first switch and a second communication pathway interconnecting that data storage device to a second switch.

In certain embodiments, Applicants' apparatus further includes a midplane interconnecting one or more controllers to one or more data storage devices. In the illustrated embodiment of FIG. 3, controller 210 (FIGS. 2, 3) comprises Fibre Channel switch 214 (FIGS. 2, 3, 4) and SES processor 212 (FIGS. 2, 3, 4). In the certain embodiments, SES processor 212 comprises table 213 wherein table 213 comprises certain default signal compensation settings. A plurality of communication links 320 interconnect Fibre Channel switch 216 to midplane 310. A plurality of communication links 340 interconnect data storage devices 270 (FIGS. 2, 3, 4) with midplane 310.

Controller 240 (FIGS. 2, 3) comprises Fibre Channel switch 244 (FIGS. 2, 3, 4) and SES processor 242 (FIGS. 2, 3, 4). In the certain embodiments, SES processor 242 comprises table 243 wherein table 243 comprises certain default signal compensation settings. A plurality of communication links 330 interconnect Fibre Channel switch 244 to midplane 310.

Signals are provided by switch 214 to data storage devices 270 via communication links 320, communication links 340, and midplane 310. Similarly, signals are provided by switch 244 to data storage devices 270 via communication links 330, communication links 340, and midplane 310. Applicants' invention comprises a method to adjust signal compensation settings based upon the predetermined length of the aggregate communication link between a data storage device and a switch.

Figure 6:
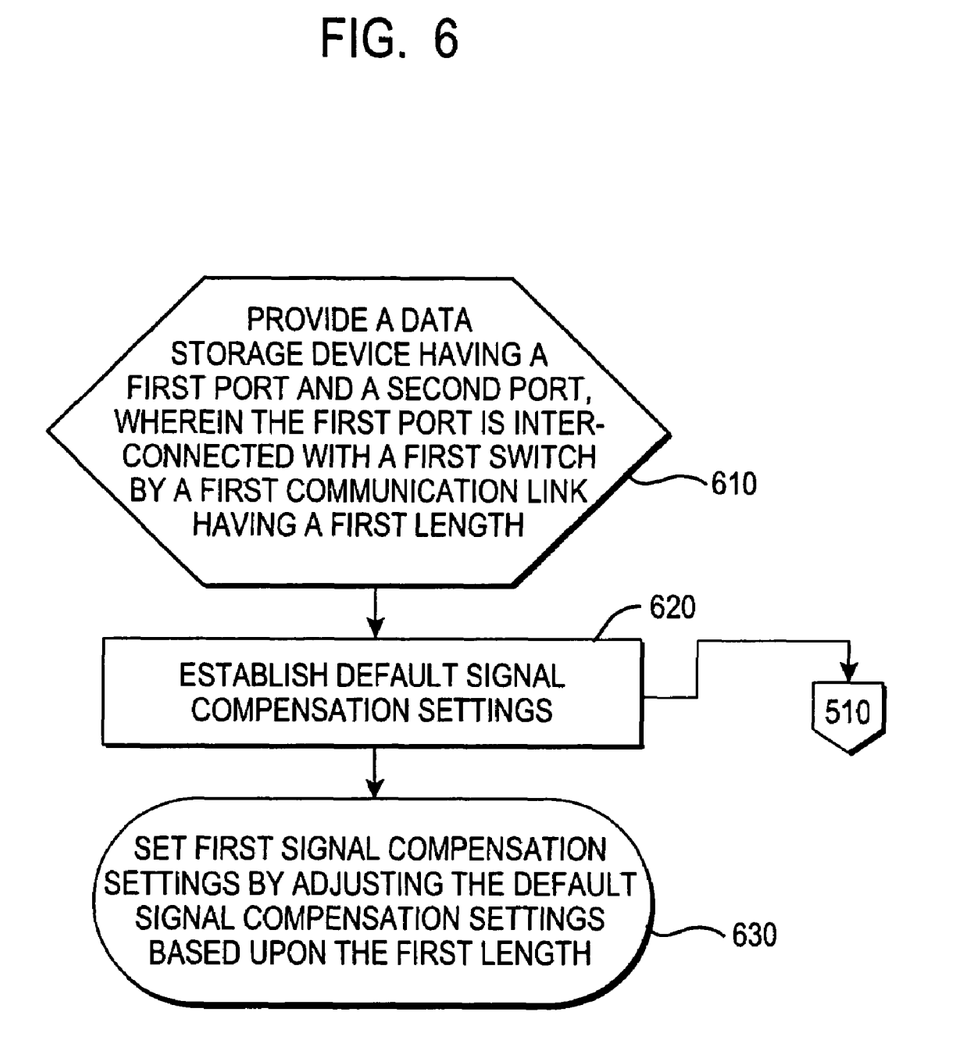
FIG. 6 is a flow chart summarizing the certain steps of Applicants' method.

Referring now to FIG. 6, in step 610 Applicants' method provides a data storage device, such as for example data storage device 405 (FIG. 4), where that data storage device comprises a first port, such as port 410 (FIG. 4) and a second port, such as port 420 (FIG. 4), interconnected with a first switch, such as switch 214 (FIGS. 2, 3, 4) by a first communication pathway, such as communication pathway 430, having a first length, where that first length is known. In certain embodiments, step 610 further comprises providing a data storage device, such as data storage device 405, where that data storage device is interconnected with a second switch, such as switch 244, by a second communication pathway 440, having a second length, where that second length is known.

In step 620, Applicants' method provides default signal compensation levels. In certain embodiments, the default signal compensation levels of step 620 comprise one or more default input signal compensation settings. In certain embodiments, the default signal compensation levels of step 620 comprise one or more default output signal compensation settings. In certain embodiments, the default signal compensation levels of step 620 comprise one or more default input signal compensation settings and one or more default output signal compensation settings.

In certain embodiments, the default signal compensation levels of step 620 are established by the manufacturer of the information storage and retrieval system comprising the data storage device. In other embodiments, the default signal compensation levels are established by the manufacturer of the data storage device. In yet other embodiments, the default signal compensation levels are set during system startup. In still other embodiments, the default signal compensation levels are provided by a host computer.

Applicant's method adjusts certain output signal compensation settings for the signals provided by the data storage device to the switch. In certain embodiments, these output signal compensation settings include, without limitation, signal pre-emphasis, signal amplitude, and output termination. As those skilled in the art will appreciate, pre-emphasis increases the magnitude of certain frequencies with respect to the magnitude of other frequencies, in order to improve the overall signal-to-noise ratio by minimizing the adverse effects of such phenomena as attenuation differences in subsequent parts of the system.

Applicants' input signal compensation setting adjusts the sensitivity of a data storage device to signals provided to that device by a switch. In certain embodiments, Applicants' input signal compensation settings include, without limitation, signal amplitude, common mode sensitivity, and thresholds for loss of signal.

Referring again to FIG. 6, in step 630 Applicants' method determines first signal compensation settings by adjusting the default signal compensation levels of step 620 based upon the known first length of step 610. In certain embodiments, step 630 is performed by the data storage device, such as data storage device 405. In other embodiments, step 630 is performed by a processor, such as processor 214, interconnected with the data storage device by the first communication link. In certain embodiments, step 630 is performed by an interconnected host computer, such as host computer 390 (FIG. 1).

Figure 5:
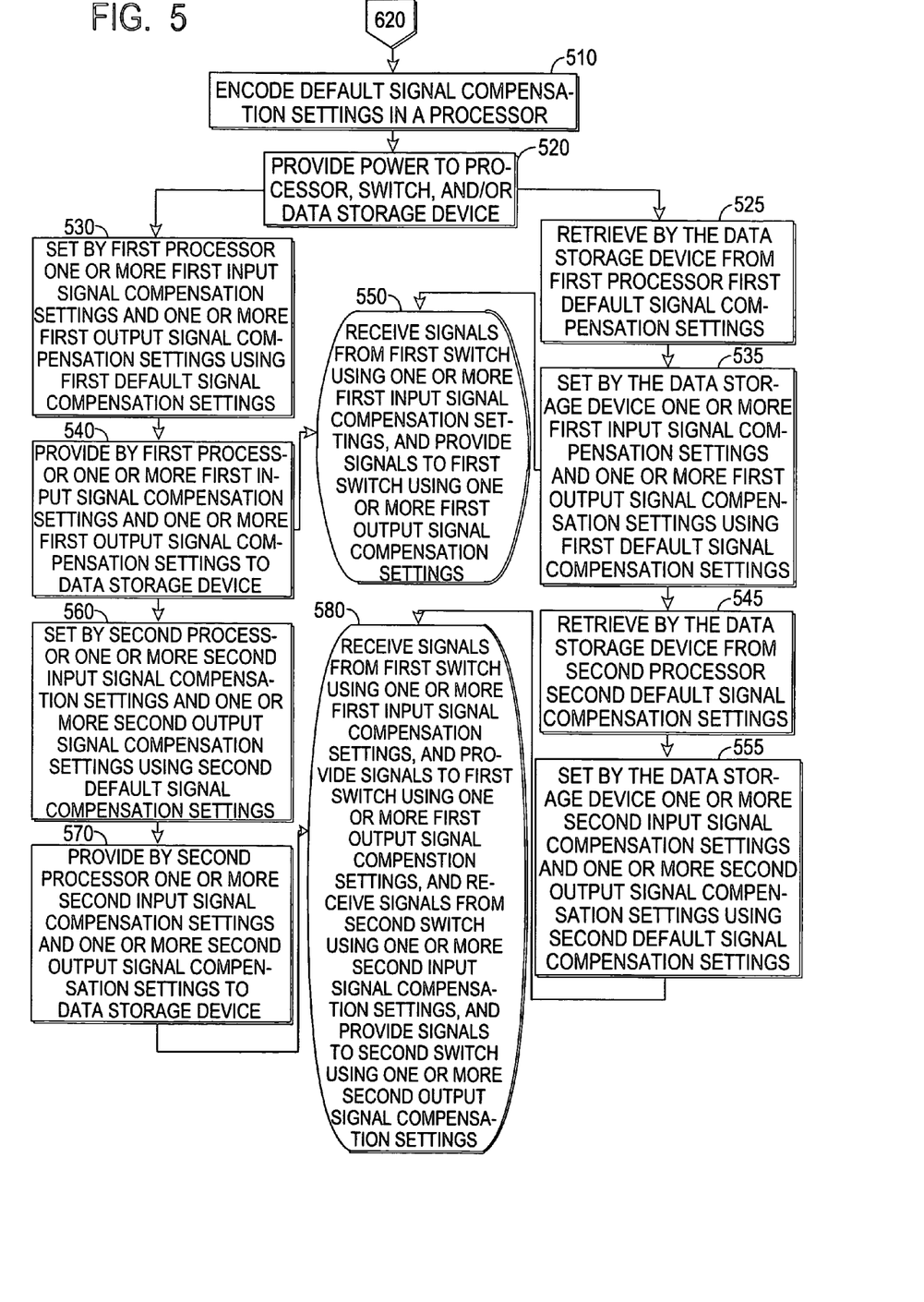
FIG. 5 is a flow chart summarizing certain additional steps in Applicants' method.

In certain embodiments, Applicants' method transitions from step 620 to step 510 (FIG. 5). Referring now to FIG. 5, in step 510 Applicants' method encodes the default signal compensation settings in a processor, such as processor 212 (FIGS. 2, 3, 4). In certain embodiments, those default signal compensation settings comprise a table, such as table 213 (FIGS. 3, 4), encoded in that processor. In certain embodiments, step 510 is performed by the manufacturer of the information storage and retrieval system. In certain embodiments, step 510 is performed at system startup.

In step 520, Applicants' method provides power to all or a portion of Applicants' information storage and retrieval system, where that newly-powered portion includes a data storage device. Such a power-on event may comprise a system startup, a system reset, a power-on restart of the data storage device, and the like.

In certain embodiments, Applicants' method transitions from step 520 to step 525, wherein the data storage device, such as device 405, queries a first interconnected processor, such as processor 212, to obtain first default signal compensation settings. In certain embodiments, those default signal compensation settings are encoded in a table, such as table 213, disposed in the processor.

Applicants' method transitions from step 525 to step 535 where in certain embodiments the data storage device sets one or more first output signal compensation settings by adjusting first default signal compensation settings based upon the predetermined length of a first communication pathway, such as pathway 430, interconnecting the data storage device and a first switch, such as switch 214. Step 535 further comprises setting by the data storage device one or more first input signal compensation settings by adjusting first default signal compensation settings based upon the predetermined length of a first communication pathway, such as pathway 430, interconnecting the data storage device and a first switch, such as switch 214.

In other embodiments, the data storage device in step 535 sets one or more first output signal compensation settings by adjusting first default signal compensation settings based upon the address of that device. In these embodiments, each data storage device is assigned an address specific to its position in the storage array, such that the length of the communication pathway for each address is known. Table 1 recites addresses for the 16 data storage devices comprising storage array 270 (FIGS. 2, 3, 4).

TABLE 1

| Data Storage Device No. | Address |
| --- | --- |
| 0 | 0h |
| 1 | 8h |
| 2 | 6h |
| 3 | Eh |
| 4 | 7h |
| 5 | Fh |
| 6 | 1h |
| 7 | 9h |
| 8 | 2h |
| 9 | Ah |
| 10 | 3h |
| 11 | Bh |
| 12 | 4h |
| 13 | Ch |
| 14 | 5h |
| 15 | Dh |

In these data storage device address embodiments, step 535 further comprises setting by the data storage device one or more first input signal compensation settings by adjusting first default signal compensation settings based upon the data storage device address.

In certain embodiments, Applicants' method transitions from step 535 to step 550 wherein the data storage device receives signals from a first interconnected switch using one or more first input signal compensation settings, and provides signals to that interconnected first switch using one or more first output signal compensation settings.

In certain embodiments, Applicants' method transitions from step 535 to step 545 wherein the data storage device queries a second interconnected processor, such as processor 242, to obtain second default signal compensation settings. In certain embodiments, those default signal compensation settings are encoded in a table, such as table 243 (FIG. 3), disposed in the processor.

Applicants' method transitions from step 545 to step 555 where in certain embodiments the data storage device sets one or more second output signal compensation settings by adjusting second default signal compensation settings based upon the predetermined length of a second communication pathway, such as pathway 440, interconnecting the data storage device and a second switch, such as switch 244. Step 555 further comprises setting by the data storage device one or more second input signal compensation settings by adjusting second default signal compensation settings based upon the predetermined length of a second communication pathway, such as pathway 440, interconnecting the data storage device and a second switch, such as switch 244.

In other embodiments, the data storage device in step 555 sets one or more second output signal compensation settings by adjusting second default signal compensation settings based upon the address of that data storage device. In these embodiments, step 555 further comprises setting by the data storage device one or more second input signal compensation settings by adjusting second default signal compensation settings based upon the address of the data storage device.

Applicants' method transitions from step 555 to step 580 wherein the data storage device receives signals from a first interconnected switch using one or more first input signal compensation settings, and provides signals to that first interconnected switch using one or more first output signal compensation settings, and wherein the data storage devices receives signals from a second interconnected switch using one or more second input signal compensation settings, and provides signals to that second switch using one or more second output signal compensation settings.

In certain embodiments, Applicants' method transitions from step 520 to step 530 wherein a first processor, such as processor 212, sets one or more first output signal compensation settings by adjusting first default signal compensation settings based upon the predetermined length of a first communication pathway, such as pathway 430, interconnecting the data storage device and a first switch, such as switch 214. In these embodiments, step 530 further comprises setting by the first processor one or more first input signal compensation settings by adjusting first default signal compensation settings based upon the predetermined length of a first communication pathway, such as pathway 430, interconnecting the data storage device and a first switch, such as switch 214.

In other embodiments, in step 530 a first processor, such as processor 212, sets one or more first output signal compensation settings by adjusting first default signal compensation settings based upon the address of the data storage device. In these embodiments, step 530 further comprises setting by the first processor one or more first input signal compensation settings by adjusting first default signal compensation settings based upon the address of the data storage device. Applicants' method transitions from step 530 to step 540 wherein the first processor provides the first output signal compensation settings and the first input signal compensation value to the data storage device.

In certain embodiments, Applicants' method transitions from step 540 to step 550. In other embodiments, Applicants' method transitions from step 540 to step 560 wherein a second processor, such as processor 242, sets one or more second output signal compensation settings by adjusting second default signal compensation settings based upon the predetermined length of a second communication pathway, such as pathway 440, interconnecting the data storage device and a second switch, such as switch 244. In these embodiments, step 560 further comprises setting by the second processor one or more second input signal compensation settings by adjusting second default signal compensation settings based upon the predetermined length of a second communication pathway, such as pathway 440, interconnecting the data storage device and a second switch, such as switch 244.

In other embodiments, in step 560 a second processor, such as processor 242, sets one or more second output signal compensation settings by adjusting second default signal compensation settings based upon the address of the data storage device. In these embodiments, step 560 further comprises setting by the second processor one or more second input signal compensation settings by adjusting second default signal compensation settings based upon the address of the data storage device.

Applicants' method transitions from step 560 to step 570 wherein the second processor provides one or more second output signal compensation settings and one or more second input signal compensation value to the data storage device. Applicants' method transitions from step 570 to step 580.

The embodiments of Applicants' method recited in FIGS. 5 and/or 6, may be implemented separately. Moreover, in certain embodiments, individual steps recited in FIGS. 5 and/or 6 may be combined, eliminated, or reordered.

In certain embodiments, Applicants' invention includes instructions residing in microcode, such as for example microcode 216 (FIG. 2), 226 (FIG. 2), 236 (FIG. 2), 246 (FIG. 2), 256 (FIG. 2), and/or 266 (FIG. 2), where those instructions are executed by a processor, such as processor 212 (FIG. 2), 222 (FIG. 2), 232 (FIG. 2), 242 (FIG. 2), 252 (FIG. 2), and/or 262 (FIG. 2), respectively, to perform step 630 recited in FIG. 6, and/or steps 530, 540, 560, and/or 570, recited in FIG. 5. In certain embodiments, Applicants' invention includes instructions residing in a data storage device, such as data storage device 405 (FIG. 4), to perform step 630 recited in FIG. 6, and/or steps 525, 535, 545, 550, 555, and/or 580, recited in FIG. 5.

In other embodiments, Applicants' invention includes instructions residing in any other computer program product, where those instructions are executed by a computer external to, or internal to, system 100, to perform step 630 recited in FIG. 6, and/or steps 530, 540, 560, and/or 570, recited in FIG. 5. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to set signal compensation settings for a data storage device, comprising the steps of:
    providing a data storage device comprising a first port and a second port, wherein said first port is interconnected to a first switch via a first communication pathway having a predetermined first length;
    determining first signal compensation settings based upon said first length;
    providing default signal compensation settings:
    wherein said determining step comprises adjusting said default signal compensation settings based upon said first length;
    said providing default signal compensation settings further comprises providing one or more default input signal compensation settings and one or more default output signal compensation settings;
    said providing default signal compensation settings step further comprises providing a table comprising said one or more default input signal compensation settings and one or more default output signal compensation settings;
    wherein said adjusting step comprises retrieving said one or more default input signal compensation settings and one or more default output signal compensation settings from said table.

2. The method of claim 1, further comprising the step of providing a processor comprising memory, wherein said processor is capable of communicating with said data storage device, further comprising the step of encoding said default signal compensation settings in said memory.

3. The method of claim 2, further comprising the steps
    retrieving said default signal compensation settings by said data storage device from said memory;
    wherein said determining step further comprises:
    setting one or more first output signal compensation settings by said data storage device; and
    setting one or more first input signal compensation settings by said data storage device.

4. The method of claim 2, further comprising the steps
    retrieving said default signal compensation settings by said processor from said memory;
    wherein said determining step further comprises setting one or more first output signal compensation settings by said processor, and setting one or more first input signal compensation settings by said processor;
    providing to said data storage device by said processor said one or more first output signal compensation settings and said one or more first input signal compensation settings.

\* \* \* \* \*